UNITED STATES PATENT OFFICE.

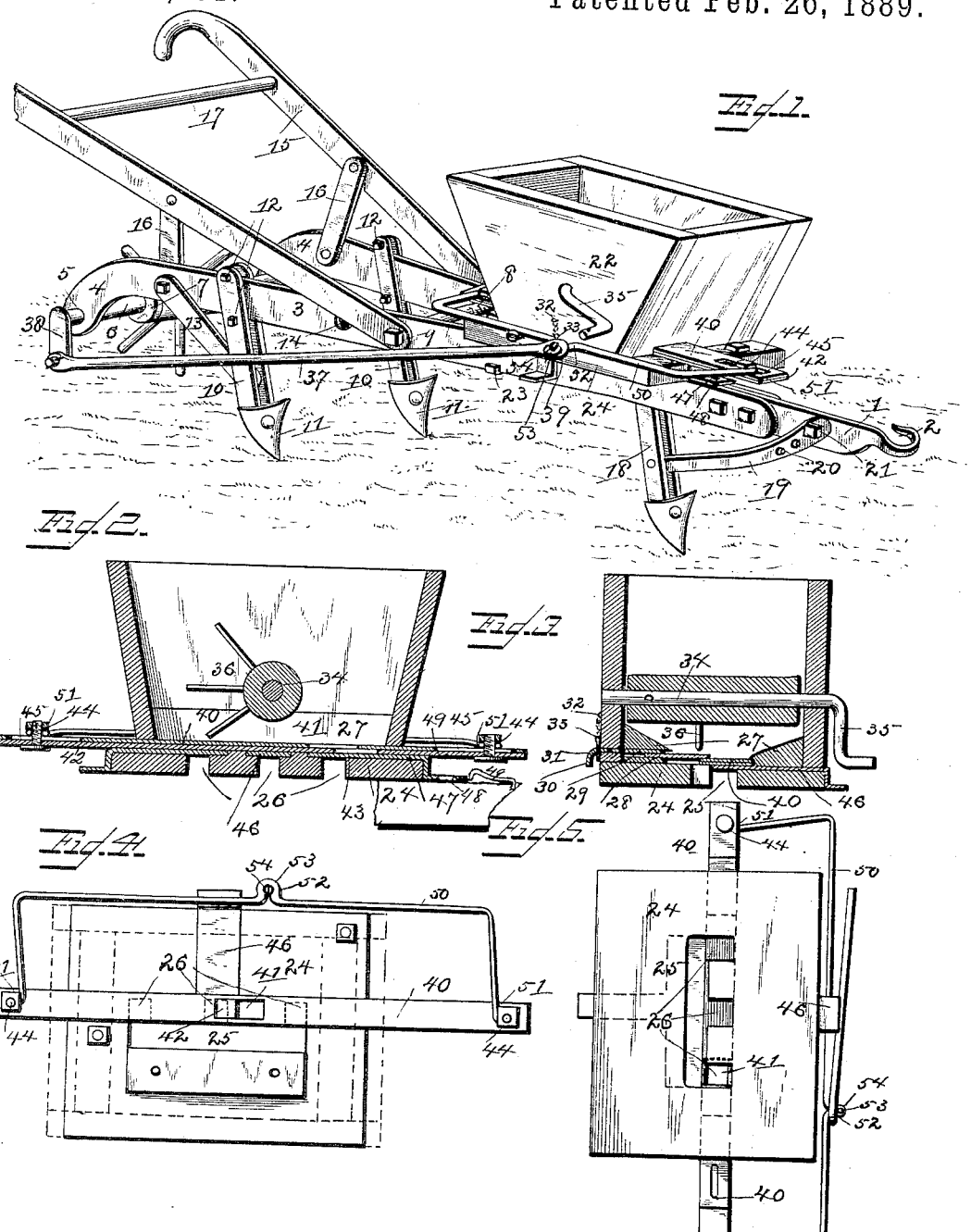

EDWARD D. CARTER, OF CELESTE, TEXAS.

COMBINED CULTIVATOR AND PLANTER.

SPECIFICATION forming part of Letters Patent No. 398,701, dated February 26, 1889.

Application filed May 5, 1888. Serial No. 272,955. (No model.)

*To all whom it may concern:*

Be it known that I, EDWARD D. CARTER, a citizen of the United States, and a resident of Celeste, in the county of Hunt and State of Texas, have invented certain new and useful Improvements in a Combined Cultivator and Corn and Cotton Planter; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved combined cultivator and seeding-machine. Fig. 2 is a longitudinal vertical sectional view of the seed-box and its operating parts. Fig. 3 is a transverse vertical sectional view of the same. Fig. 4 is a top plan view of the said parts, showing the seed-box in dotted lines, so as to disclose the dropping mechanism more plainly; and Fig. 5 is a bottom view of the seeding mechanism.

The same numerals of reference indicate the same or corresponding parts in all the figures.

My invention has relation to combined cultivators and seeding-machines; and it consists in the improved construction and combination of parts of a combined cultivator and seeding-machine, principally a corn and cotton planter, as will be more fully described hereinafter, and particularly pointed out in the claims.

In the accompanying drawings, the numeral 1 indicates the forward short beam, which is formed with the draft-hook 2, and to the rear portion of which the beams 3 are secured with their forward converging ends. The rear ends, 4, of these beams are curved downward and formed with perforations or bearings 5 for the ends of the axle 6 of the drive-wheel 7, which is journaled removably with its ends in the said bearings. The beams are held spread at their rear portions by a rod, 8, having its screw-threaded ends inserted through perforations in the beams and secured by means of nuts 9, so that the beams may be adjusted at various distances from each other, according to the width of the rows to be planted or cultivated.

The standards 10 consist of doubled flat bars having the blades 11 bolted in the lower doubled ends in the usual and well-known manner for such standards, and the upper ends of the standards are secured to and clamped upon the beams by means of nutted bolts 12, which admit of the standards being adjusted at various places upon the beams. Brace-rods 13 are pivotally secured between the doubled bars and to the beams, so that by shifting the standards upon the beams the pitch of the standards and of the blades may be adjusted.

One beam, preferably the right-hand beam, is provided with a perforation a short distance to the rear of the perforation for the curved rod, as shown at 14, so that the standard may be moved forward and have the upper end of its brace-rod secured in this perforation.

The handles 15 are secured with their forward ends upon the ends of the rods by means of the adjusting-bolts, and have brace-rods 16 to the rear ends of the beams and a tranverse rod, 17, separating them.

The forward standard, 18, is pivotally connected to the rear end of the forward short beam with its upper ends between the forward ends of the beams, and the brace-rod 19 of the standard is provided with a number of perforations, 20, by means of which it may be adjusted upon a bolt, 21, in the forward beam, adjusting the pitch of the forward standard.

The seed-box 22 is secured upon the forward portions of the beams by means of hooked and nutted rods 23, passed through the bottom 24 of the seed-box, and having hooks at the lower ends engaging the edges of the beams and nuts at the upper ends drawing the bottom against the upper edges of the beams, and the bottom of the seed-box is formed with a longitudinal slot, 25, having three notches or rectangular recesses or apertures, 26, at its ends and at its middle.

Two inwardly-inclined blocks, 27, are secured in the bottom of the seed-box, having their inner edges extending, respectively, to the edge of the slot and to the ends of the apertures or notches from the slot, and a plate, 28, slides between one of the blocks and the bottom, covering the slot when pushed in, and is provided with a flat arm, 29, having a downwardly-extending lip or handle, 30, and perforations 31, which may register with a staple, 32, upon the outside of the box, a pin or bolt, 33, passing through the said staple and one of the perforations when the plate is drawn out and has uncovered the slot in the bottom of the box. A shaft, 34, is journaled in the sides of the box and has a crank, 35, at one end, and this shaft is provided with a number of radiating arms, 36, which may project into the slot when the latter is uncovered, serving as stirrers for planting cotton-seed.

A connecting-rod, 37, is pivoted to a crank, 38, upon the end of the drive-wheel axle, and may be pivoted with its forward eyed end 39 upon the crank 35 of the rock-shaft 34 of the box.

A slide, 40, reciprocates in suitable ways in the seed-box above the bottom, and has a central aperture or seed-cup, 41, which may register with the apertures in the bottom, and which is of the same size as the said apertures, and a bar, 42, slides adjustably under the slide, having an aperture, 43, which may register with the aperture of the seed-slide, or may cover it partly or entirely, the ends of the bar having nutted bolts 44, which slide in longitudinal slots 45 in the ends of the seed-slide, and by means of which the size of the seed-aperture may be adjusted by adjusting the sliding bar under the slide. The central aperture or notch from the slot is normally covered by a sliding plate, 46, having its end projecting out at the side of the box, the plate sliding upon the bottom of the seed-box and under the seed-slide, and the forward aperture is closed or covered in the same manner by a sliding plate, 47, having a longitudinal slot, 48, in the forward end, designed to be engaged by the free leg of a bolt or staple, 49, the other leg of which is rigidly secured in the central forward beam. When the plate is slid in to cover the aperture, as shown in Fig. 2, the free leg rests against the end of the plate and prevents its working out; but when it is desired to draw the plate out to uncover the aperture it is only necessary to lift the leg a sufficient distance to allow the plate to slide under it, and then slide the same back and allow the free leg to drop into the slot 48, when the plate will be held securely in position and the end of the free leg will engage with the slot and hold the plate in position—pulled out.

A rod, 50, has its two ends bent inward and formed with eyes 51, with which it may be secured to the nutted bolts adjusting the plate under the seed-slide, the said bolts thus securing the rod to the slide, and the middle of this rod is doubled and bent outward to form a pivot, 52, for the forward eye of the connecting-rod, the said eye being secured upon the pivot, when the machine is to be used for corn or similar seed, the eye of the rod being held in place upon the pivot by means of a key, 53, inserted through an eye, 54, formed at the end of the pivot.

The operation of the machine will be readily understood. The forward standard will open the furrow for the seed, which will be dropped by the mechanism in the box, and will be covered by the blades of the rear standard. The seed-slide will be reciprocated by the revolving drive-wheel, and when one aperture is uncovered the seed will be dropped once for each reciprocation of the seed-slide and for each revolution of the wheel. When the other end aperture is also opened, the seed will be dropped twice for each revolution, and when all three apertures are uncovered the seed will be dropped once at each end and twice at the middle for each revolution. When cotton is to be planted, the apertures are covered and the connecting-rod is removed from the pivot upon the rod of the seed-slide, which is placed so as to cover the rear aperture, and the sliding plate is now removed or slid out, so as to leave the slot uncovered to the desired width, whereupon it is secured by inserting the pin or key into the perforation registering with the staple upon the side of the box, and the connecting-rod is secured to the crank of the rock-shaft, when the stirrers will feed the cotton-seed down through the slot.

Having thus described my invention, I claim and desire to secure by Letters Patent of the United States—

1. The combination of the box having the slot and the three apertures in the side of the slot, as shown and described, the reciprocating seed-slide, and the sliding and adjustable plate covering the slot, as shown, and for the purpose specified.

2. The combination of the staple having one leg rigidly secured to the upper side of the forward central beam, and the sliding plate having the slot near its end and engaging with the free leg of the staple, as and for the purpose specified.

In testimony that I claim the foregoing as my own I have hereunto affixed my signature in presence of two witnesses.

EDWARD D. CARTER.

Witnesses:
CHRISTOPHER C. PERRIN,
MACK. ROYALS.